United States Patent [19]
Peterson et al.

[11] Patent Number: 5,168,698
[45] Date of Patent: Dec. 8, 1992

[54] FUEL MANIFOLD SYSTEM FOR GAS TURBINE ENGINES

[75] Inventors: Ivan H. Peterson, Hamilton; Bruce A. Hamblin, Cincinnati, both of Ohio

[73] Assignee: General Electric Company, Cincinnati, Ohio

[21] Appl. No.: 688,401

[22] Filed: Apr. 22, 1991

[51] Int. Cl.$^5$ ............................................. F02C 7/22
[52] U.S. Cl. .................................. 60/39.02; 60/39.31; 60/739
[58] Field of Search ............... 60/39.094, 39.463, 733, 60/739, 741, 746, 747, 39.31, 39.02

[56] References Cited

U.S. PATENT DOCUMENTS

| | | | |
|---|---|---|---|
| 2,744,383 | 5/1956 | Sedillo | 60/39.463 |
| 2,988,878 | 6/1961 | Hopper | 60/35.6 |
| 3,793,838 | 2/1974 | Nash | 60/261 |
| 4,312,185 | 1/1982 | Nash et al. | 60/739 |
| 4,402,184 | 9/1983 | Faulkner et al. | 60/739 |
| 4,852,348 | 8/1989 | Allard et al. | 60/270.1 |
| 4,903,478 | 2/1990 | Seto et al. | 60/39.281 |
| 5,031,407 | 7/1991 | Zaremba et al. | 60/739 |

Primary Examiner—Louis J. Casaregola
Attorney, Agent, or Firm—Jerome C. Squillaro; John R. Rafter

[57] ABSTRACT

A rigid fuel manifold system for use in a gas turbine engine which is resistant to vibrations from operation of the engine. The system comprises two fuel feed manifolds, a fuel drain manifold and support brackets which attach these manifolds to one another and provide a structure with a high natural frequency above the 1/rev of the engine operating range. Structural support brackets that permit easy assembly and low installation stress are also provided.

11 Claims, 3 Drawing Sheets

FUEL MANIFOLD SYSTEM FOR GAS TURBINE ENGINES

FIELD OF THE INVENTION

The invention relates to fuel supply systems for high efficiency gas turbine engines for aircraft propulsion and particularly to a new and improved fuel manifold system resistant to vibration during operation of the gas turbine engine.

BACKGROUND OF THE INVENTION

The invention is directed to improved dual fuel feed manifold systems for high efficiency gas turbine engines which also have a drain manifold wherein all three manifolds are attached together to provide a structure with a resident frequency that resists vibration during operation of the gas turbine engine.

Vibrations within gas turbine engines poses a problem in that stress crack failures may result over a period of time. Vibration of certain components often results because the natural frequency of the component corresponds to the number of cycles (revolutions) of the engine over the operating range. Fuel manifold systems with a single annular fuel feed tube have been found to have many natural frequencies in the 1/rev engine operating range of conventional gas turbine engines. Fuel systems used for aircraft propulsion with dual fuel feed manifolds have been described in U.S. Pat. Nos. 4,903,478 and 4,312,185. The individual manifolds of a dual fuel feed system can be vulnerable to vibration from engine operation in the same manner as the manifold in single fuel feed systems. Applicants have now developed an integrated manifold system which utilizes dual fuel feed manifolds and has a high natural frequency above the 1/rev excitation range of the engine.

OBJECT OF THE INVENTION

One object of the invention is to reduce the vibrations which cause stress crack failures in gas turbine engine components during operation, specifically engines manufactured by General Electric Co. under the designations CF6-80EI and GE90.

Another object of the invention is to provide a fuel manifold system with a high first natural frequency which is above the 1/rev excitation range of most gas turbine engines in operation.

Yet another object of the invention is to provide a support bracket for attaching the fuel and drain manifolds of the system to provide a stiff rigid structure with a high natural frequency which eliminates chafing and wear of parts in close proximity and also allows easy assembly with minimal installation stress.

SUMMARY OF THE INVENTION

A fuel manifold system for use in a gas turbine engine is provided which comprises a) two annular fuel feed manifolds which receive atomized fuel from a fuel source and feed a plurality of fuel nozzles and b) an annular fuel drain manifold which receives unused atomized fuel from the fuel nozzles and returns it to the fuel source. A plurality of structural support brackets form part of the system and provide the means by which the annular fuel feed manifolds and fuel drain manifold are rigidly attached to one another.

The invention also provides a fuel manifold support bracket of a triangular configuration having three circular retaining rings or eyelets, each adapted to receive one of the two annular fuel feed manifolds or the annular fuel drain manifold.

DETAILED DESCRIPTION OF THE DRAWINGS

Figure 1:
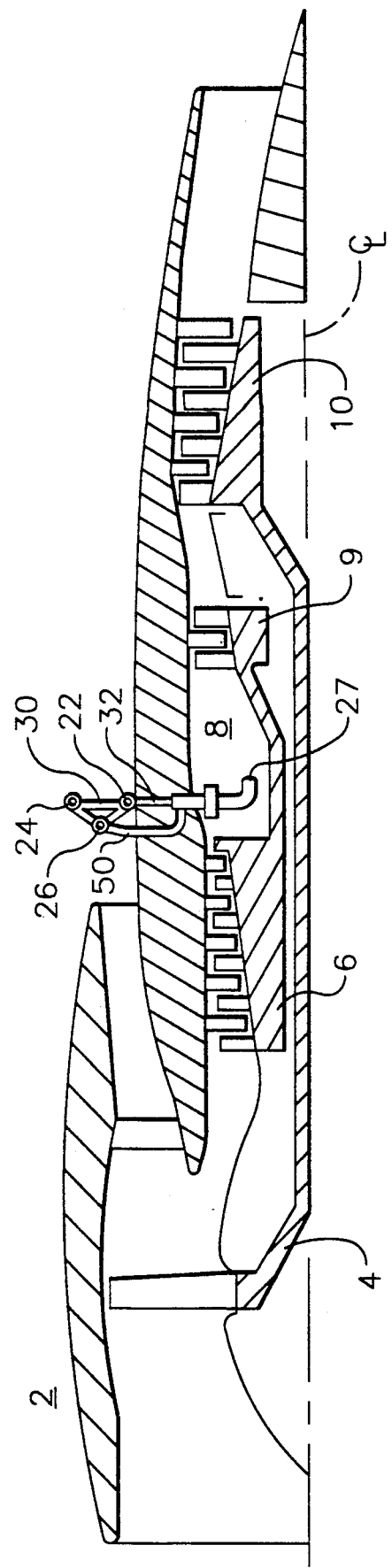
FIG. 1 is a diagrammatic cross-section of a gas turbine engine showing the location of a fuel manifold system within a gas turbine engine.

A gas turbine engine 2 of the high bypass type is shown in FIG. 1 and comprises a fan section 4, a compressor section 6, a combustor section 8 and a turbine section 10. The combustor section 8 burns air and fuel to provide high temperature gases to flow into the turbine section 10, which then extracts energy from the high temperature gas. A high turbine 9 powers the compressor 6 and turbine section 10 powers the fan 4. Surrounding the combustor section 8 is the manifold assembly 30, which is more particularly shown in FIG. 2. A fuel nozzle 27 is shown extending within the combustor section 8.

The manifold system 30 comprises a two annular fuel feed manifolds 22 and 24 and an annular fuel drain manifold 26.

Figure 2:
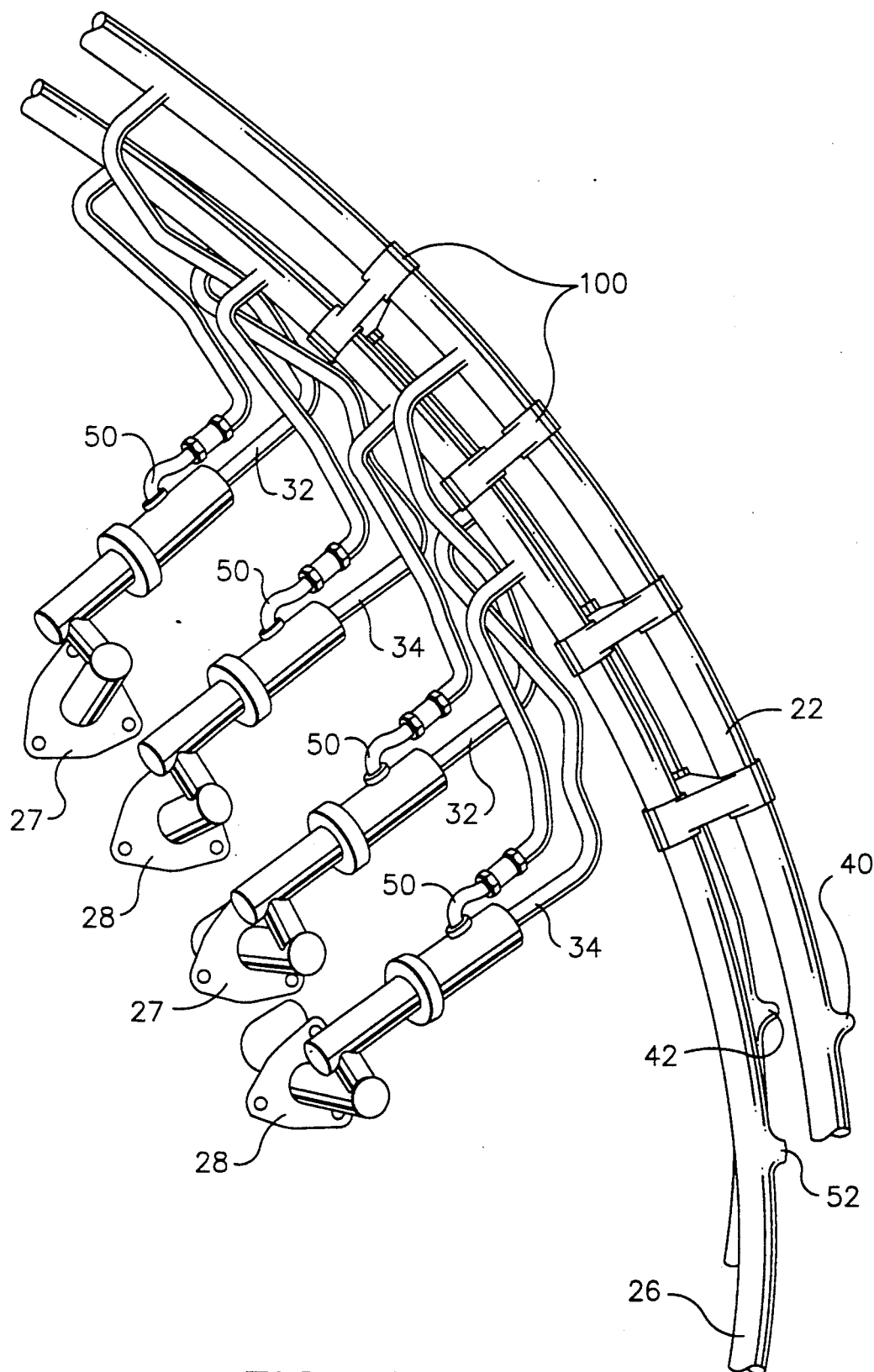
FIG. 2 is a partial perspective schematic view of a fuel manifold system of the present invention with the relative positions of the fuel nozzles, supply lines, support brackets and manifolds shown in accordance with an embodiment of the present invention.

In the embodiment shown in FIG. 2, the first fuel feed manifold 22 and second fuel feed manifold 24 supply two separate series of fuel nozzles, i.e., a first plurality of fuel nozzles 27 and a second plurality of fuel nozzles 28. This is accomplished through a first and second plurality of fuel nozzle lines 32 and 34, respectively. Fuel is supplied to manifolds 22 and 24 through first and second fuel inlets 40 and 42, respectively. Drain lines 50 feed unused atomized fuel from the fuel nozzles 27 and 28 into the annular fuel drain manifold 26. This fuel is then returned to the fuel supply via return outlet 52. A plurality of support brackets 100 support and position the three manifolds to provide a rigid structure. Preferably from 10 to 30, most preferably about 20, support brackets are used.

The arrangement of fuel nozzles 27 and 28, fuel nozzle line 32 and 34 and drain lines 50 can vary widely as can the inlets 40 and 42 by which the feed manifolds are supplied with fuel and the outlet 52 from which the drain manifold returns fuel. In preferred embodiments, a first plurality of fuel nozzles 27 are uniformly positioned in an alternating arrangement with the second plurality of fuel nozzles 28. Preferably, the fuel nozzles are positioned uniformly and circumferentially with respect to the engine center line, shown in FIG. 1. Thirty fuel nozzles have been found to be an advantageous total number which provide even distribution of fuel and temperature in the combustor section during engine operation.

The manifold system of this invention operates as follows. The fuel manifold system 30 supplies an atomized fuel and air mixture to the fuel nozzles 27 and 28 in a manner to promote complete combustion. Fuel is supplied to the fuel feed manifolds through first and second fuel inlets 40 and 42, respectively, from a fuel supply, preferably with the aid of a control means, not shown. This fuel control means meters out the amount of fuel to be burned in the combustor section 8 in response to the pilot's requests or a predetermined schedule controlled by a digital electronic engine computer which monitors aircraft flight and engine parameters.

Unused fuel passes from the fuel nozzles 27 and 28 through drain lines 50 to fuel drain manifold 26 and is returned to the fuel supply via outlet 52. This unused fuel is typically recycled back to the fuel feed manifolds.

Support bracket 100 provides the proper spacing and support for the fuel feed and fuel drain manifolds. FIG. 2 shows the relative positioning of the support bracket 100 with respect to the manifolds. The circular eyelets provide support and fixturing during fabrication. Brazing the manifolds into the rings of support 100 provides a stiff structure that eliminates chafing and wear of parts in close proximity.

The components of the manifold system of this invention can be made from conventional materials suitable for use in fuel manifolds for gas turbine engines. Materials of high strength and temperature resistance are preferred.

The annular fuel feed manifolds and drain manifolds are preferably tubular in configuration and circular cross-section. These manifolds can be of any diameter suitable for use in gas turbine engines.

Figure 3:
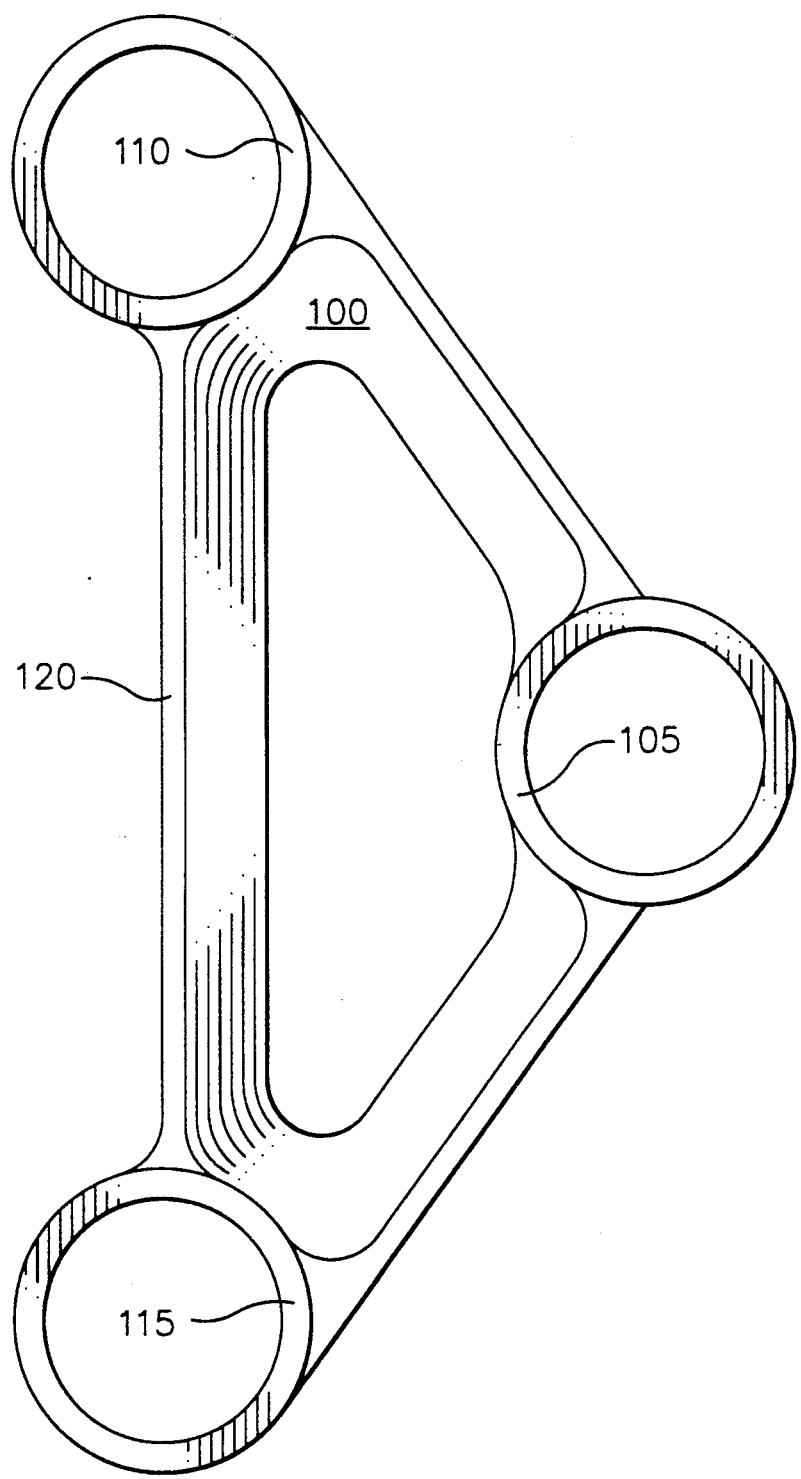
FIG. 3 is a diagrammatic sketch of a structural support bracket in accordance with an embodiment of the invention.

FIG. 3 illustrates a structural support 100 having retaining rings 105, 110 and 115. Retaining ring 105 is adapted to receive the drain manifold and retaining rings 110 and 115 are adapted to be brazed to separate fuel feed manifolds. These retaining rings are "ARC BORED" and configured to permit easy assembly. The radius of the eyelet hole is bored so as to match the arc of the manifold. This is accomplished by known arc-boring methods. The clearance between the eyelet hole and the manifold preferably ranges from 0.001–0.003 inches. Frame 120 is of a triangular configuration and supports the retaining rings 105, 110 and 115 so as to position the centers of the three manifolds in a triangular configuration relative to each other. It is recognized that the configuration of the frame can vary widely and the three manifolds may be positioned in any one of the three points of this triangular configuration. In addition, retaining rings (eyelets) 105, 110 and/or 115 may be semicircular.

It is to be understood that this invention is not limited to the particular embodiment disclosed, and it is intended to cover all modifications coming within the scope of this invention as claimed.

What is claimed is:

1. A fuel manifold system for use in a gas turbine engine comprising:
   a) two annular fuel feed manifolds which feed a plurality of fuel nozzles;
   b) an annular fuel drain manifold which receives unused fuel from the fuel nozzles;
   c) wherein said annular fuel feed manifolds and fuel drain manifold are rigidly attached to each other by a plurality of structural support brackets; and
   d) wherein each of said structural support brackets includes three retaining rings, wherein each of said retaining rings is ARC BORED to conform to an arcuate shape of one of said two annular fuel feed manifolds or said annular fuel drain manifold.

2. A fuel manifold system for use in a gas turbine engine comprising:
   a) two annular fuel feed manifolds which feed a plurality of fuel nozzles;
   b) an annular fuel drain manifold which receives unused fuel from the fuel nozzles;
   c) wherein said annular fuel feed manifolds and fuel drain manifold are rigidly attached to each other by a plurality of structural support brackets; and
   d) wherein the support brackets spatially orient the centers of the three manifolds in a triangular configuration relative to each other.

3. A fuel manifold system as in claim 2, wherein the fuel feed manifolds circumscribe the fuel drain manifold.

4. A fuel manifold system as in claim 2, wherein the two fuel feed manifolds independently supply different fuel nozzles.

5. A fuel manifold system as in claim 1, wherein the fuel feed manifolds and fuel drain manifold are brazed to the support bracket in order to eliminate chafing and wear on said fuel feed manifolds and said drain manifold which can be positioned in close proximity.

6. A fuel manifold system for use in a gas turbine engine comprising:
   a) two annular fuel feed manifolds which feed a plurality of fuel nozzles;
   b) an annular fuel drain manifold which receives unused fuel from the fuel nozzles;
   c) wherein said annular fuel feed manifolds and fuel drain manifold are rigidly attached to each other by a plurality of structural support brackets; and
   d) wherein the structural support bracket is triangular in configuration with three retaining rings, each adapted to be brazed to one of the two annular fuel feed manifolds or the annular fuel drain manifold.

7. A fuel manifold system as in claim 6, wherein the retaining ring is a circular eyelet.

8. A fuel manifold system as in claim 6, wherein the retaining ring is semicircular.

9. A fuel manifold system as in claim 2, wherein each of said structural support brackets includes three retaining rings, wherein each of said retaining rings if ARC BORED to conform to an arcuate shape of one of said two annular fuel feed manifolds or said annular fuel drain manifold.

10. A fuel manifold system as in claim 2, wherein the fuel feed manifolds and fuel drain manifolds are brazed to the support bracket.

11. A method for providing a fuel manifold system with a first natural frequency above a 1/rev excitation range of a gas turbine engine in operation, said fuel manifold system including two annular fuel feed manifolds which feed a plurality of fuel nozzles, an annular fuel drain manifold which receives unused fuel from the fuel nozzles, and a plurality of structural support brackets, each of said structural support brackets including three retaining rings, the method of comprising the steps of:
   a) rigidly attaching each of said two annular fuel feed manifolds and said annular fuel drain manifold to each other with said plurality of structural support brackets;
   b) spatially orienting the centers of the three manifolds in a triangular configuration relative to each other;
   c) ARC BORING each of said retaining rings to conform to an arcuate shape of one of said two annular fuel feed manifolds or said annular fuel drain manifold; and
   d) brazing each of said two annular fuel feed manifolds and said annular fuel drain manifold to each of said plurality of structural support brackets.

* * * * *